United States Patent
Bessenet et al.

(10) Patent No.: US 10,773,968 B2
(45) Date of Patent: Sep. 15, 2020

(54) METHOD FOR PRODUCING POTASSIUM SULFATE FROM POTASSIUM CHLORIDE AND SULFURIC ACID

(71) Applicant: Veolia Water Technologies, Inc., Moon Township, PA (US)

(72) Inventors: Sebastien Bessenet, Naperville, IL (US); Didier Le Flammec, Saint Arnoult en Yvelines (FR)

(73) Assignee: Veolia Water Technologies, Inc., Moon Township, PA (US)

( * ) Notice: Subject to any disclaimer, the term of this patent is extended or adjusted under 35 U.S.C. 154(b) by 0 days.

(21) Appl. No.: 16/332,381

(22) PCT Filed: Sep. 6, 2017

(86) PCT No.: PCT/US2017/050156
§ 371 (c)(1),
(2) Date: Mar. 12, 2019

(87) PCT Pub. No.: WO2018/052767
PCT Pub. Date: Mar. 22, 2018

(65) Prior Publication Data
US 2020/0071176 A1 Mar. 5, 2020

Related U.S. Application Data

(60) Provisional application No. 62/393,934, filed on Sep. 13, 2016.

(51) Int. Cl.
*C01D 5/04* (2006.01)
*C01B 7/07* (2006.01)
*B01D 9/00* (2006.01)

(52) U.S. Cl.
CPC .............. *C01D 5/04* (2013.01); *B01D 9/0018* (2013.01); *B01D 9/0045* (2013.01); *C01B 7/0718* (2013.01)

(58) Field of Classification Search
CPC ............... C01D 5/00; C01D 5/02; C01D 5/16
See application file for complete search history.

(56) References Cited

U.S. PATENT DOCUMENTS

| | | | |
|---|---|---|---|
| 3,998,935 A | | 12/1976 | Adams et al. |
| 4,045,543 A | * | 8/1977 | Sardisco ................. C01B 7/035 423/482 |
| 4,436,710 A | * | 3/1984 | Miyazaki ................. C01D 5/02 423/552 |
| 4,588,573 A | * | 5/1986 | Worthington ............ C01D 5/00 423/552 |
| 2001/0026787 A1 | * | 10/2001 | Stauffer ................. C01B 7/035 423/482 |
| 2013/0121900 A1 | | 5/2013 | Neuman et al. |

FOREIGN PATENT DOCUMENTS

| | | |
|---|---|---|
| CN | 104876248 A | 9/2015 |
| RU | 2548959 C2 | 4/2015 |
| SU | 1527143 A1 | 12/1989 |

OTHER PUBLICATIONS

RU Search Report dated Oct. 14, 2019 in re RU Application No. 2019109964 filed Apr. 4, 2019.

* cited by examiner

*Primary Examiner* — Timothy C Vanoy
(74) *Attorney, Agent, or Firm* — Coats & Bennett PLLC (57) ABSTRACT

A process is provided for producing potassium sulfate from potassium chloride and sulfuric acid. The process entails mixing potassium chloride with the water to form a potassium chloride slurry which is mixed with recycled sulfuric acid to form a $K^+$, $Cl^-$, $SO_4^{2-}$ acid mixture. This mixture is subjected to a crystallization process that produces potassium sulfate crystals and a hydrochloric acid-water vapor. The hydrochloric acid is separated from the hydrochloric acid-water vapor to form a hydrochloric acid solution.

26 Claims, 6 Drawing Sheets

METHOD FOR PRODUCING POTASSIUM SULFATE FROM POTASSIUM CHLORIDE AND SULFURIC ACID

This application is a U.S. National Stage Application of PCT Application No. PCT/EP2017/050156, with an international filing date of 6 Sep. 2017. Applicant claims priority based on U.S. Provisional Patent No. 62/393,934 filed 12 Sep. 2016. The subject matter of these applications is incorporated herein.

FIELD OF THE INVENTION

The present invention relates to systems and processes for producing potassium sulfate from potassium chloride and sulfuric acid.

BACKGROUND OF THE INVENTION

The production of potassium sulfate from potassium chloride and sulfuric acid has been extensively evaluated in the past due to its rarity and commercial value. A Mannheim furnace, which utilizes high temperatures ranging from 450-600° C. to promote the dry conversion of KCl to $K_2SO_4$, is conventionally used. Among the drawbacks to this process, one stands out. This process requires large amount of energy, so much energy that the feasibility of the process in some cases in questionable.

U.S. Pat. No. 3,998,935 describes a method in which KCl is reacted with a hot solution of $KHSO_4$ to produce $K_2SO_4$ by cooling crystallization. However, because direct contact occurs in a separate reactor followed by the cooling crystallization step, a three stage reaction is required for the method to be completed. Further, this method produces an excess of $KHSO_4$ at some input concentrations.

The method described in U.S. Pat. No. 4,045,543 attempts to reduce the complexity of the method described in U.S. Pat. No. 3,998,935 by eliminating the crystallization of an intermediate salt. This is accomplished by a four stage process: reaction, evaporation, crystallization, and filtration. The primary drawback here, however, is that the process is not economically favorable due to the required step of HCl evaporation which produces a relatively low concentrated solution.

U.S. Pat. No. 4,436,710 suggests a method in which a moderately high temperature (290-350° C.) is used to form a mixed salt of $K_2SO_4$ and $KHSO_4$. This is followed by a dissolution step in aqueous phase and cooling crystallization to produce $K_2SO_4$, and is in essence a Mannheim-like process step followed by two crystallization steps. As such, it does not substantially improve on energy requirements.

The process described in U.S. Pat. No. 4,588,573 uses the approach of U.S. Pat. Nos. 3,998,935 and 4,045,543 by reacting KCl and $H_2SO_4$ while evolving an $HCl/H_2O$ distillate. The solution is cooled for crystallization of highly acidic mixed salts, which are converted stepwise from $KH_3(SO_4)_2$ to $KHSO_4$ to $K_2SO_4$. However, this is a multi-stage process and utilizes an arrangement similar to that described in U.S. Pat. No. 3,998,935.

Finally, WO 03/074424 presents an approach wherein a double salt, $K_3HSO_4$, is separated and converted to $K_2SO_4$ by dilution into water.

All of the above processes are multi-stage and fairly complex processes, often requiring the production of intermediate salts, or are energy intensive and therefore not economically feasible. Further, the use of cooling crystallization often results in significant KCl crystallization, which is an undesirable impurity in the $K_2SO_4$ salts. Therefore, there is a need for a relatively simple process for producing $K_2SO_4$ that, compared to many conventional processes, consumes less energy, and does not include multiple stage complex processes and processes that require cooling crystallization.

SUMMARY OF THE INVENTION

The present invention discloses a method in which the reactants, KCl and $H_2SO_4$, are not directly contacted in a first process unit. Instead, a KCl slurry or solution is contacted with a recycled $H_2SO_4$ rich stream in an evaporative crystallizer, producing crystallized $K_2SO_4$ and a vapor mixture of HCl and $H_2O$. At this point, the vapor mixture of HCl and $H_2O$ may be treated in separate processes to recover a more concentrated HCl if desired. Further, the crystallized $K_2SO_4$ may at this point undergo further processes for cleaning and/or improving quality. Commercial grade $H_2SO_4$ is introduced in the tank that collects the mother liquor or filtrate coming from the separation/dewatering unit. Residual Chloride in the filtrate is pushed out of the liquid to the vapors. The resulting solution is the recycled $H_2SO_4$ rich stream.

In one embodiment of the present invention, there is disclosed a method for producing potassium sulfate and hydrochloric acid. The method entails mixing water with potassium chloride to form a potassium chloride slurry or solution. The potassium chloride slurry or solution is mixed with recycled sulfuric acid to form a $K^+$, $Cl^-$, $SO_4^{2-}$ acid mixture. Thereafter, the $K^+$, $Cl^-$, $SO_4^{2-}$ acid mixture is directed to an evaporative crystallizer unit where a crystallization process takes place and which produces a concentrate containing potassium sulfate crystals and a hydrochloric acid-water vapor. The concentrate containing the potassium sulfate crystals is directed to a solids-liquid separator and the potassium sulfate crystals are separated from the concentrate, yielding a filtrate. Thereafter, the potassium sulfate crystals are washed. Further, as an option, the process includes separating the hydrochloric acid from the hydrochloric acid-water vapor to form a hydrochloric acid solution. As an option, the concentrate produced includes crystals comprising potassium and sulfate. The potassium and sulfate crystals may be in the form of potassium sulfate ($K_2SO_4$), potassium bisulfate ($KHSO_4$) or a mixture of both.

Other objects and advantages of the present invention will become apparent and obvious from a study of the following description and the accompanying drawings which are merely illustrative of such invention.

DESCRIPTION OF EXEMPLARY EMBODIMENTS

The present invention may be applied in a number of exemplary embodiments. At a basic level, the present invention follows a method in which a potassium chloride (KCl) slurry or solution is contacted with a recycled $H_2SO_4$ rich stream in an evaporative crystallizer. The crystallization process produces the desired product, crystallized $K_2SO_4$, and a vapor mixture of HCl and $H_2O$. Each of these products may then undergo further treatment; for example, the HCl/$H_2O$ vapor may be processed to produce a concentrated HCl solution, while the crystallized $K_2SO_4$ may undergo cleaning processes.

Figure 1:
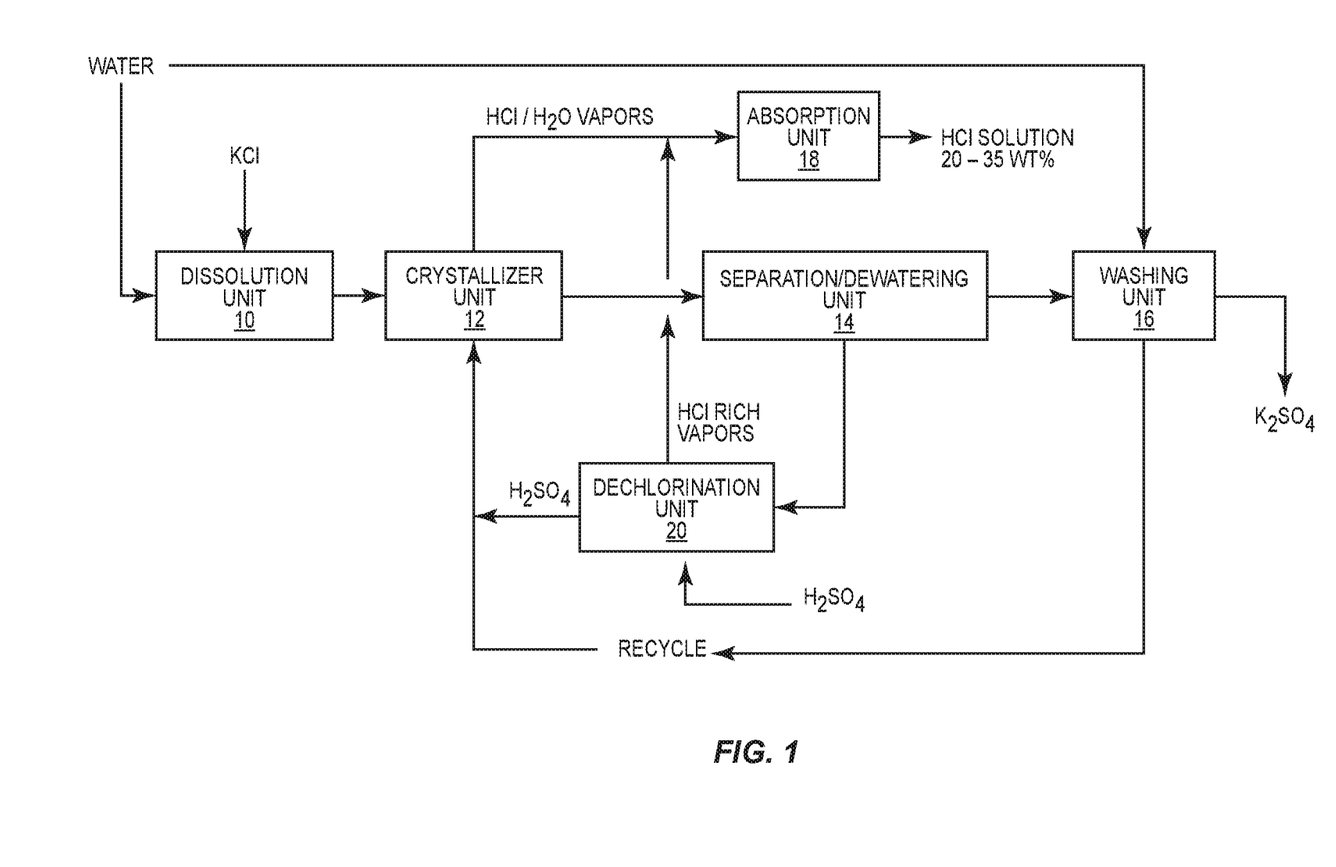
FIG. 1 is a schematic illustration of a basic process for producing potassium sulfate and hydrochloric acid.

FIG. 1 shows an exemplary embodiment. Water and potassium chloride are first introduced in a dissolution unit 10, producing the KCl slurry or solution which is directed to a crystallizer unit 12. A recycled $H_2SO_4$ rich stream is also directed to the crystallizer unit 12, and reacts with the KCl slurry to produce $K_2SO_4$ and HCl, and $H_2O$. Alternatively, the recycled $H_2SO_4$ rich stream is mixed with the KCl slurry upstream of the crystallizer unit 12. Crystallizer unit 12 should be set and controlled such that very little to no chloride salt will crystallize with the $K_2SO_4$. After evaporative crystallization occurs, the crystallizer unit 12 produces a concentrate containing crystallized $K_2SO_4$ and an HCl/$H_2O$ vapor. In some cases and as an option, the concentrate produced by the crystallizer unit 12 includes crystals comprising potassium sulfate or potassium bisulfate or mixtures of both. The concentrate containing the crystallized $K_2SO_4$ is sent to a separation and dewatering unit 14, whereupon the solid salt crystals are separated from the concentrate to yield a filtrate. The solids, including $K_2SO_4$ crystals are then directed to a washing unit 16 to ensure that no entrained liquor, which might affect the salt quality after drying, remains. After washing, the final desired $K_2SO_4$ product is collected.

The filtrate produced by the solids-liquid separation or dewatering unit 14 is directed to a dechlorination unit 20. This unit removes almost all Chloride from the filtrate to produce HCl rich vapors, which are then combined with the HCl/$H_2O$ vapor produced by the crystallizer unit 12. $H_2SO_4$ is added to the remaining filtrate in the dechlorination unit 20, producing an $H_2SO_4$ rich solution. This further has the effect of increasing the acidity of the $H_2SO_4$ rich solution high enough such that the residual chloride in the filtrate forms concentrated HCl, while the potassium bisulfate remains soluble. At this stage, impurities from the raw KCl, such as magnesium and calcium, may be removed as precipitated sulfate solids to improve the quality of the final potassium and sulfate crystals. The liquid solution produced by mixing the filtrate from the separation/dewatering unit 14 with $H_2SO_4$ is combined with the waste stream produced from the washing unit 16 to produce a recycled $H_2SO_4$ rich stream, which is directed back to the crystallizer unit 12 for reaction. The HCl rich vapors from the dechlorination unit 20 and the HCl/$H_2O$ vapor from crystallizer unit 12 are directed to an absorption unit 18, producing a high concentration HCl solution. This high concentration HCl solution in one embodiment is about 20-35% HCl by weight.

Because the exact composition of the HCl/$H_2O$ vapor from crystallizer unit 12 and thus the final concentration of the HCl solution is governed by the acidity level in the liquor in the crystallizer unit 12 and the residual potassium content after crystallization, instances may occur in which the final HCl solution does not meet a desired or threshold concentration. Therefore, in cases where the concentration of HCl in the vapor produced by the crystallizer unit 12 is relatively low, it may be desirable to provide a concentration process that increases the HCl concentration.

Figure 2:
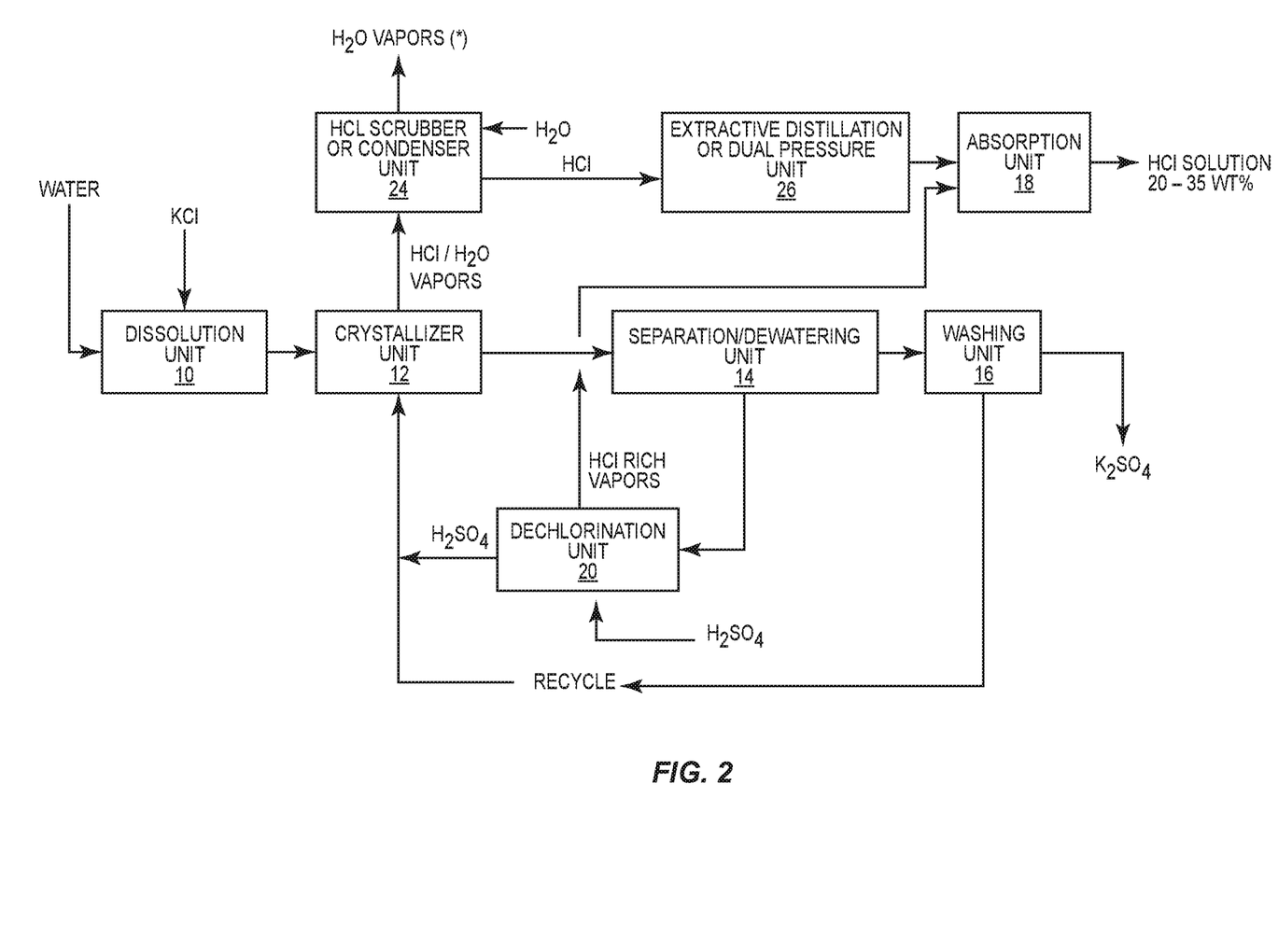
FIG. 2 is a schematic illustration of a potassium sulfate production process similar in many respects to that shown in FIG. 1 but including additional processes for treating the $HCl/H_2O$ vapors produced by the crystallizer to produce a more concentrated HCl solution.

FIG. 2 illustrates an alternate process similar to that of FIG. 1, but including an HCl scrubber or condenser unit 24. The HCl/$H_2O$ vapor from crystallizer unit 12 is directed to the scrubber or condenser unit 24, which produces $H_2O$ vapor and a concentrated HCl solution (for example in the range of 16-20% by weight). This concentrated solution is then directed to an optional extractive distillation or dual pressure unit 26, generating highly concentrated HCl vapors which can be directed to the absorption unit 18 to produce an HCl solution having a purity of approximately 20-35 wt. %.

Figure 3:
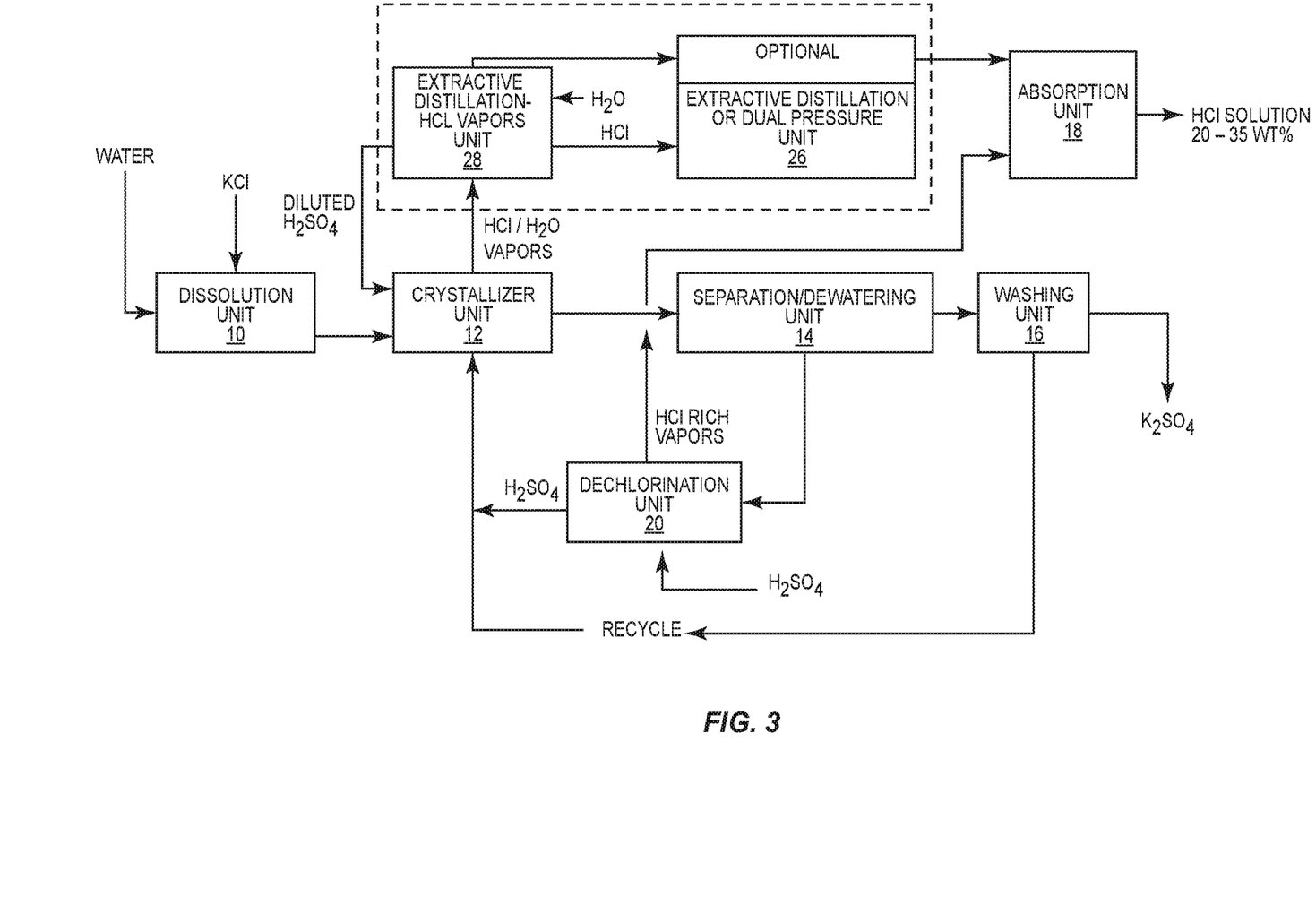
FIG. 3 is a schematic illustration of a potassium sulfate production process similar to FIG. 2 but includes another alternative process for treating the $HCl/H_2O$ vapors produced by the crystallizer to produce a more concentrated HCl solution.

In the case that the HCl solution has a lower concentration than desired but is close to the required concentration for reuse, FIG. 3 describes an alternative method to FIG. 2. The method described is similar to that in FIG. 2, but replaces the HCl scrubber or condenser unit 24 with an extractive distillation-HCl vapors dehydration unit 28, into which a feed of $H_2SO_4$ is provided. With an input stream of low concentration HCl/$H_2O$ vapor, the unit 28 produces a concentrated HCl/$H_2O$ vapor and a diluted $H_2SO_4$ solution, which may be recycled to the crystallizer unit 12.

Figure 4:
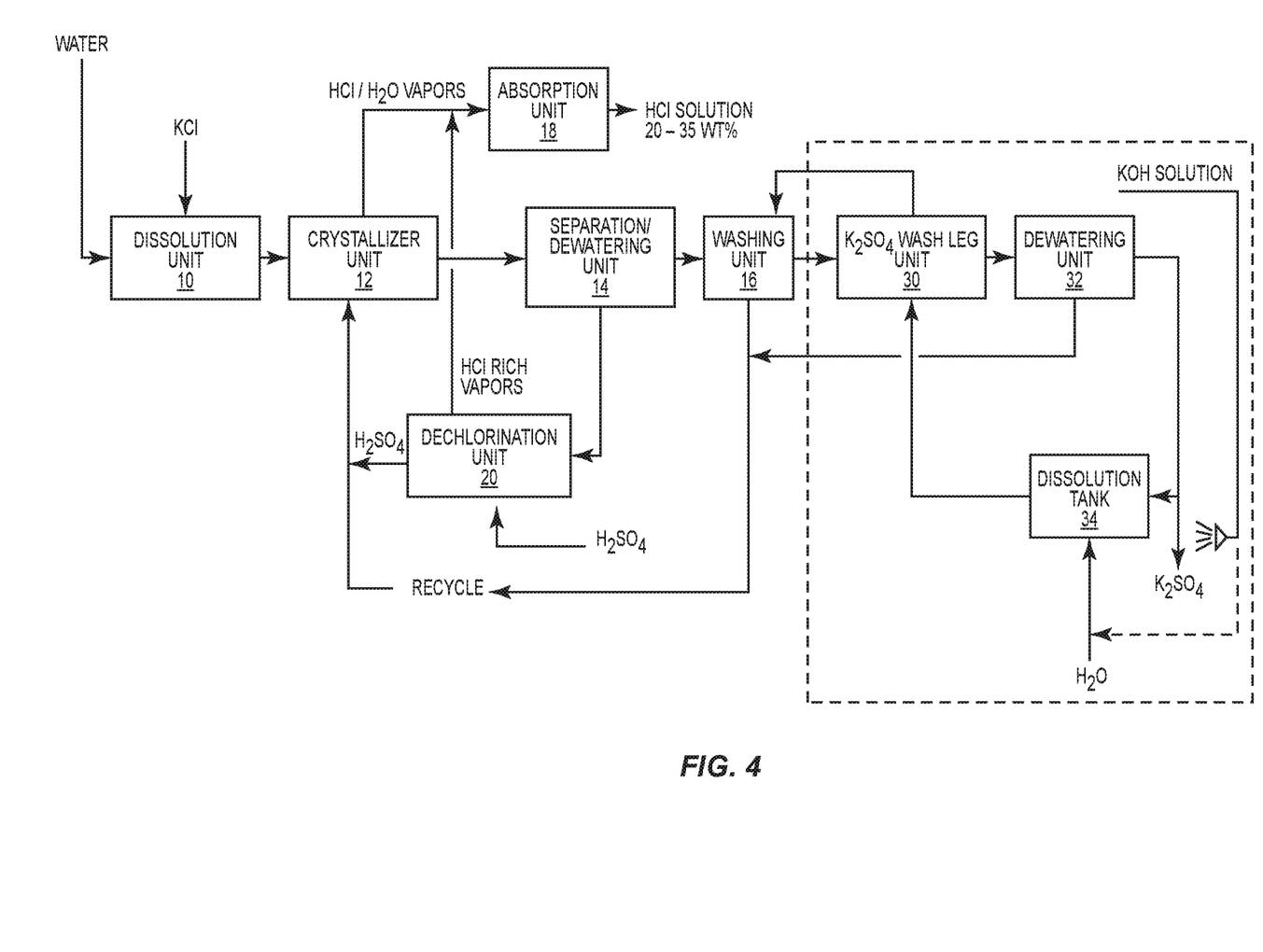
FIG. 4 is yet another alternative design for a potassium sulfate production process where the crystallized potassium sulfate is subjected to additional washings to increase the quality of potassium sulfate produced.

Finally, depending on other constituents such as chloride and potassium bisulfate content in the crystallized $K_2SO_4$, the produced $K_2SO_4$ salt may require additional cleaning to improve quality. FIG. 4 describes an exemplary embodiment of the present invention in which, after undergoing the process steps described in FIG. 1, the crystallized $K_2SO_4$ is directed to a wash leg 30 and contacted with a countercurrent flow of a potassium sulfate solution. This wash leg aims to increase the quality of the $K_2SO_4$ and may be paired with a dosage of a neutralizing base, such as KOH, in a second washing and dewatering unit 32 to further reduce the chloride and salt acidity. This further has the effect of converting possible residual potassium bisulfate into potassium sulfate. The KOH may be sprayed as a solution onto the crystals and/or in the $K_2SO_4$ dissolution tank 34.

Figure 5:
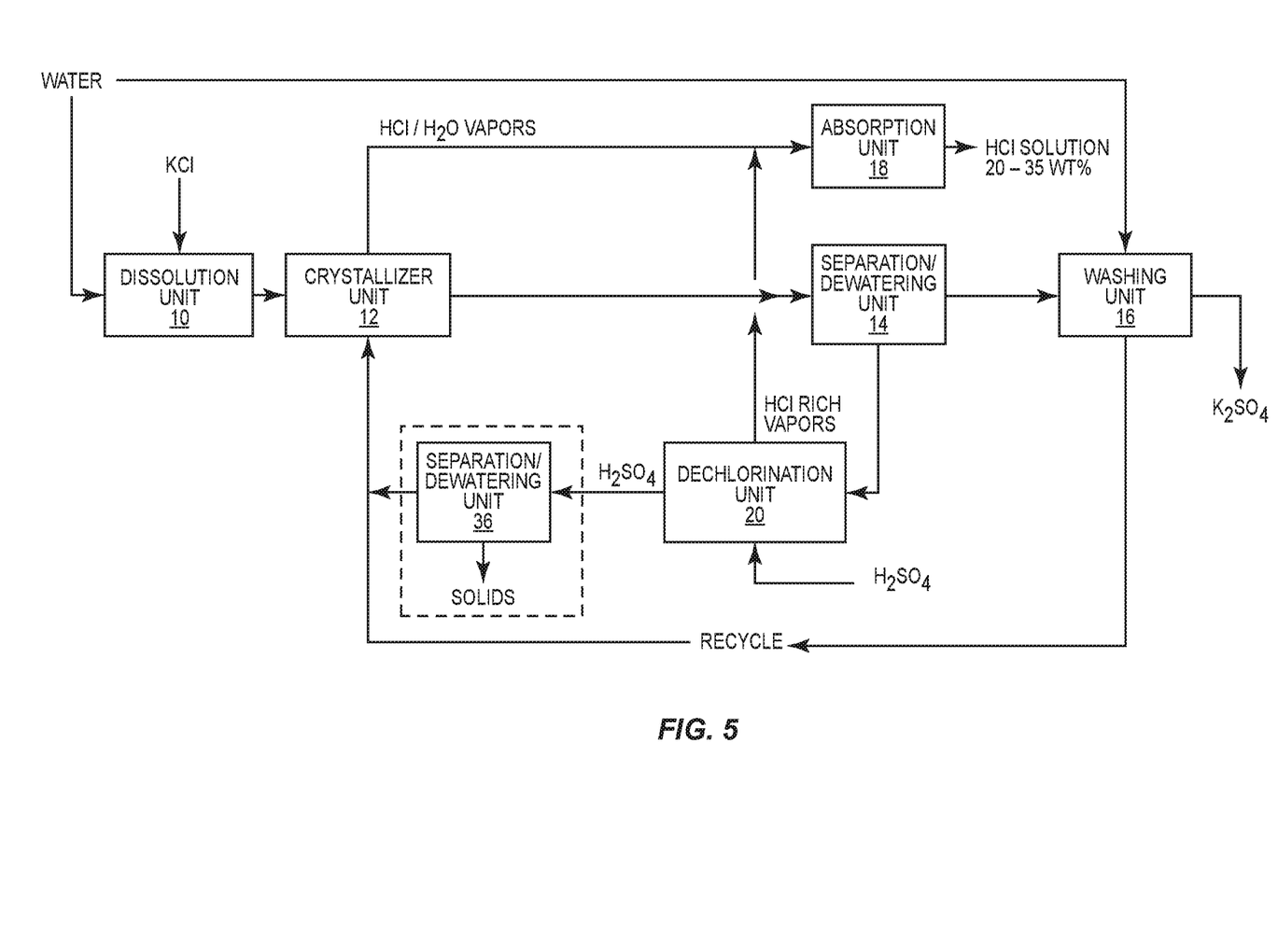
FIG. 5 is a schematic illustration of a process for producing potassium sulfate and hydrochloric acid but including an option for precipitating magnesium and calcium salts which may be added to the potassium sulfate or to a waste stream.
Figure 6:
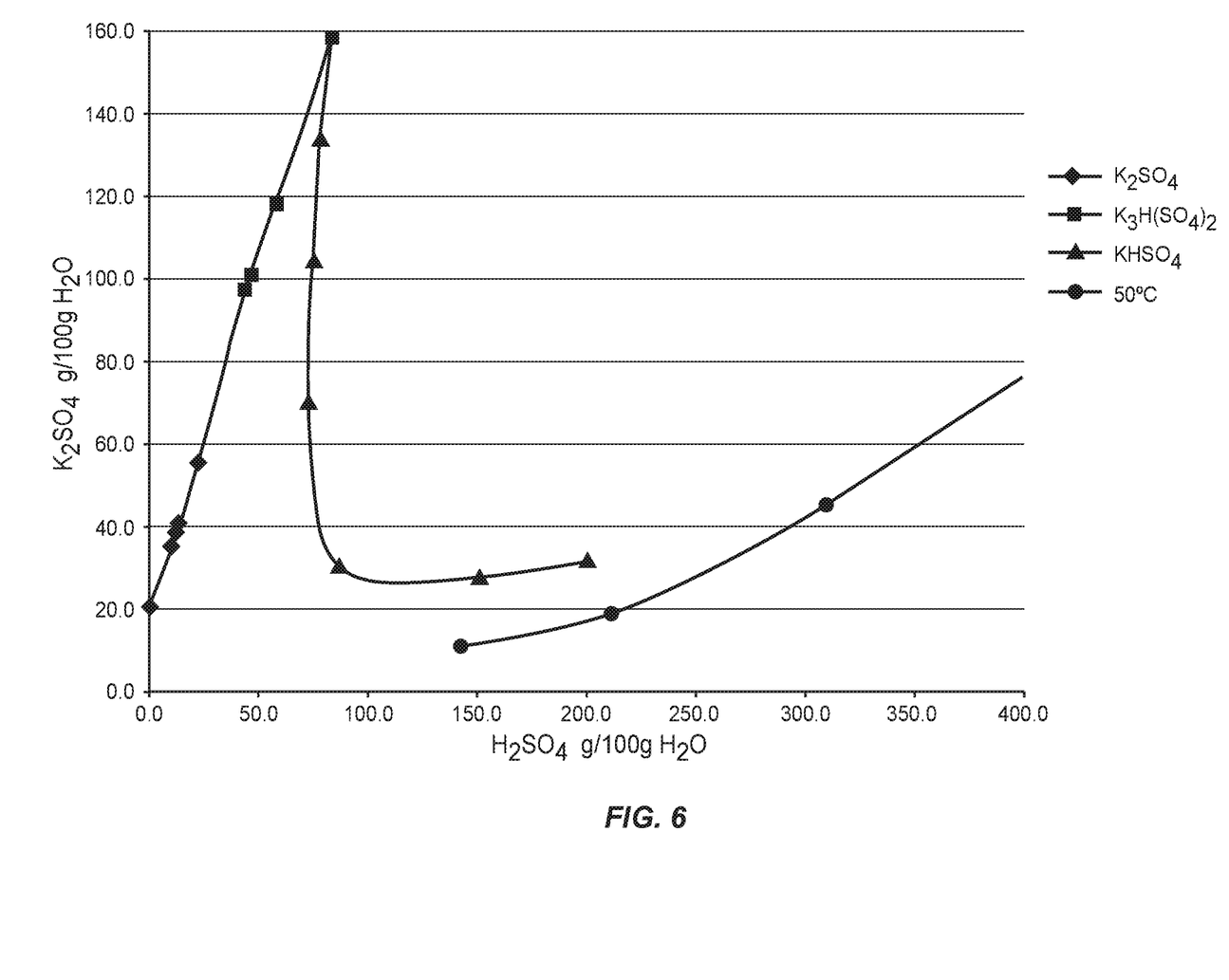
FIG. 6 comprises solubility diagrams for $K_2SO_4$, $H_2SO_4$ and $H_2O$.

FIG. 5 shows another embodiment of the process of the present invention. It is similar in many respects to the process shown in FIG. 1 and described above. However, as an option, the $H_2SO_4$-rich solution produced by the dechlorination unit 20 is directed to a separation/dewatering unit 36. Calcium and magnesium salts are precipitated and filtered and may be either added to the $K_2SO_4$ final product or to a waste stream in cases where a high $K_2SO_4$ purity is required.

The drawings show the production of $K_2SO_4$. It is appreciated by those skilled in the art that the process may also produce KCl and $KHSO_4$. Indeed, in some instances the quantity of KCl and/or $KHSO_4$ may actually exceed the quantity of $K_2SO_4$ produced. Therefore, the mixing of the potassium chloride slurry or solution with sulfuric acid will form a $K^+$, $Cl^-$, $SO_4^{2-}$ acid mixture and once subjected to a crystallization process produces a concentrate containing sulfate and potassium salts.

There are numerous advantages to the process described above. The present invention provides a process that rearranges the reactant flows into a one-stage crystallization process that enhances hydrochloric acid recovery in optimum conditions while allowing crystallization of potassium sulfate at medium acidity levels. In particular, the potassium chloride and sulfuric acid reactants are not injected at the same process step in order to shift the acidity profile compared to some conventional processes. The hydrochloric acid/water evaporation and $K_2SO_4$ crystallization are potentially performed in the same process unit. The reactants and products are expected to have a better and at least the same quality as conventional potassium sulfate production processes while resulting in significantly lower investment costs, as well as lower operation and maintenance costs. Also, the operating temperature is kept high enough to limit any potassium chloride co-precipitation with the potassium sulfate crystals. The process also provides a first washing and dewatering step for the potassium sulfate crystals which allows for displacing the solution acidity to a specific dechlorination step. The process also describes an optional second washing/dewatering step that allows for adjusting the potassium sulfate crystal properties to meet highest quality requirements.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for producing potassium sulfate and hydrochloric acid comprising:
   mixing water with potassium chloride to form a potassium chloride slurry or solution;
   mixing the potassium chloride slurry or solution with recycled sulfuric acid to form a $K^+$, $Cl^-$, $SO_4^{2-}$ acid mixture;
   subjecting the $K^+$, $Cl^-$, $SO_4^{2-}$ acid mixture to an evaporative crystallization process and producing a concentrate containing potassium sulfate crystals and a hydrochloric acid-water vapor;
   directing the concentrate containing the potassium sulfate crystals to a solids-liquid separator and separating the potassium sulfate crystals from the concentrate and yielding a filtrate;
   washing the potassium sulfate crystals with water; and
   wherein after separating the potassium sulfate crystals from the concentrate, mixing the filtrate with a source of sulfuric acid to produce a hydrochloric acid-rich vapors and a stream of sulfuric acid that forms at least a part of the recycled sulfuric acid mixed with the potassium chloride slurry or solution; and mixing the hydrochloric acid-rich vapors with the hydrochloric acid-water vapor produced by the crystallization process and wherein the hydrochloric acid-rich vapors and the hydrochloric acid-water vapor are directed to an adsorption unit which produces a hydrochloric acid solution having a concentration of 20-35% hydrochloric acid by wt.

2. The method of claim 1 wherein the filtrate includes dissolved salts and after mixing the sulfuric acid with the filtrate, precipitating the dissolved salts from the filtrate-sulfuric acid mixture.

3. The method of claim 1 including concentrating the hydrochloric acid/water vapor produced by the crystallization process to form a vapor stream having a higher hydrochloric acid concentration than the hydrochloric acid/water vapor produced by the crystallization process.

4. The method of claim 1 further including:
   mixing sulfuric acid with the filtrate to form a sulfuric acid-rich stream;
   wherein washing the potassium sulfate crystals with water produces a waste stream; and
   mixing the waste stream with the sulfuric acid-rich stream and recycling the resulting mixture to the crystallization process.

5. The method of claim 1 wherein the evaporative crystallization process is carried out in a crystallizer unit and the method includes directing the filtrate to a dechlorination unit and mixing sulfuric acid with the filtrate to produce a sulfuric acid-rich stream and recycling the sulfuric acid-rich stream to the crystallizer unit.

6. The method of claim 1 including directing the hydrochloric acid-water vapor through an absorption unit and producing a hydrochloric acid solution.

7. The method of claim 1 including directing the hydrochloric acid-water vapor to hydrochloric acid scrubber or condenser unit which produces water vapor and a hydrochloride acid solution and thereafter subjecting the hydrochloride acid solution to treatment in an absorption unit to concentrate the hydrochloric acid solution.

8. The method of claim 7 wherein before subjecting the hydrochloric acid to treatment in the absorption unit, treating the hydrochloric acid solution in an extractive distillation or dual pressure unit.

9. The method of claim 1 including directing the hydrochloric acid-water vapor to an extractive distillation-HCl vapor dehydration unit into which a feed of $H_2SO_4$ is provided which in turn produces a concentrated $HCl/H_2O$ vapor and a diluted $H_2SO_4$ solution which is recycled to the crystallization process.

10. The method of claim 9 wherein the concentrated $HCl/H_2O$ vapor is directed to an absorption unit which produces an HCl solution.

11. The method of claim 1 wherein the crystallized potassium sulfate is directed to a wash leg and contacted with a countercurrent flow of a potassium sulfate solution.

12. The method of claim 1 further including separating the hydrochloric acid from the hydrochloric acid/water vapor to form a hydrochloric acid solution.

13. The method of claim 1 including spraying a KOH solution onto the potassium sulfate crystals to neutralize residual acid on the crystals or mother liquor moisture on the crystals.

14. A method for producing potassium sulfate and hydrochloric acid comprising:
   mixing water with potassium chloride to form a potassium chloride slurry or solution;
   mixing the potassium chloride slurry or solution with recycled sulfuric acid to form a $K^+$, $Cl^-$, $SO_4^{2-}$ acid mixture;
   subjecting the $K^+$, $Cl^-$, $SO_4^{2-}$ acid mixture to an evaporative crystallization process and producing a concentrate containing crystals comprising potassium and sulfate in the form of $K_2SO_4$, $KHSO_4$, or a mixture of both;
   directing the concentrate containing said crystals of potassium and sulfate to a solids-liquid separator and separating said crystals comprising potassium and sulfate from the concentrate and yielding a filtrate;

washing the crystals comprising potassium and sulfate with water; and wherein the evaporative crystallization process is carried out in a crystallizer unit and the method includes directing the filtrate to a dechlorination unit and mixing sulfuric acid from a sulfuric acid source with the filtrate to produce a sulfuric acid-rich stream and recycling the sulfuric acid-rich stream to the crystallizer unit.

15. The method of claim 14 wherein after separating said crystals comprising potassium and sulfate from the concentrate, mixing the filtrate with a source of sulfuric acid to produce a hydrochloric acid vapor and a stream of sulfuric acid that forms at least a part of the recycled sulfuric acid mixed with the potassium chloride slurry or solution; and mixing the hydrochloric acid vapor with a hydrochloric acid/vapor produced by the crystallizer unit.

16. The method of claim 15 wherein the filtrate includes dissolved salts and after mixing the sulfuric acid with the filtrate, precipitating the dissolved salts from the filtrate-sulfuric acid mixture.

17. The method of claim 15 including concentrating the hydrochloric acid/water vapor produced by the crystallization process to form a vapor stream having a higher hydrochloric acid concentration than the hydrochloric acid/water vapor produced by the crystallization process.

18. The method of claim 15 including directing the hydrochloric acid-water vapor through an absorption unit and producing a hydrochloric acid solution.

19. The method of claim 15 including directing the hydrochloric acid-water vapor to hydrochloric acid scrubber or condenser unit which produces water vapor and a hydrochloride acid solution and thereafter subjecting the hydrochloride acid solution to treatment in an absorption unit to concentrate the hydrochloric acid solution.

20. The method of claim 19 wherein before subjecting the hydrochloric acid to treatment in the absorption unit, treating the hydrochloric acid solution in an extractive distillation or dual pressure unit.

21. The method of claim 15 including directing the hydrochloric acid-water vapor to an extractive distillation-HCl vapor dehydration unit into which a feed of $H_2SO_4$ is provided which in turn produces a concentrated $HCl/H_2O$ vapor and a diluted $H_2SO_4$ solution which is recycled to the crystallization process.

22. The method of claim 21 wherein the concentrated $HCl/H_2O$ vapor is directed to an absorption unit which produces an HCl solution.

23. The method of claim 15 further including separating the hydrochloric acid from the hydrochloric acid/water vapor to form a hydrochloric acid solution.

24. The method of claim 14 further including:

mixing a sulfuric acid source with the filtrate to form a sulfuric acid-rich stream;

wherein washing the crystals comprising potassium and sulfate with water produces a waste stream; and mixing the waste stream with the sulfuric acid-rich stream and recycling the resulting mixture to the crystallization process.

25. The method of claim 14 wherein the crystals comprising potassium and sulfate is directed to a wash system and contacted with a countercurrent flow of a potassium sulfate solution.

26. The method of claim 14 further including spraying a KOH solution on the crystals comprising potassium and sulfate to neutralize residual acid or mother liquor moisture on the crystals.

* * * * *